US010457259B2

(12) United States Patent
Wagner et al.

(10) Patent No.: US 10,457,259 B2
(45) Date of Patent: Oct. 29, 2019

(54) CONTROL DEVICE FOR AT LEAST ONE MOTORIZED PLUNGER DEVICE AND METHOD FOR OPERATING A HYDRAULIC BRAKING SYSTEM OF A VEHICLE

(71) Applicant: Robert Bosch GmbH, Stuttgart (DE)

(72) Inventors: Jens Wagner, Untergruppenbach (DE); Stefan Zahariev, Ilsfeld (DE)

(73) Assignee: Robert Bosch Gmbh, Stuttgart (DE)

( * ) Notice: Subject to any disclaimer, the term of this patent is extended or adjusted under 35 U.S.C. 154(b) by 0 days.

(21) Appl. No.: 16/035,808

(22) Filed: Jul. 16, 2018

(65) Prior Publication Data

US 2019/0023246 A1 Jan. 24, 2019

(30) Foreign Application Priority Data

Jul. 19, 2017 (DE) .................. 10 2017 212 360

(51) Int. Cl.
*B60T 13/14* (2006.01)
*B60T 13/66* (2006.01)
(Continued)

(52) U.S. Cl.
CPC ............ *B60T 13/148* (2013.01); *B60T 7/042* (2013.01); *B60T 8/00* (2013.01); *B60T 8/17* (2013.01); *B60T 8/4081* (2013.01); *B60T 13/146* (2013.01); *B60T 13/662* (2013.01); *B60T 13/745* (2013.01); *B60T 2201/03* (2013.01); *B60T 2201/122* (2013.01); *B60T 2250/04* (2013.01)

(58) Field of Classification Search
CPC .... B60T 13/148; B60T 8/4081; B60T 13/745; B60T 13/146; B60T 8/17; B60T 8/00; B60T 7/042; B60T 13/662; B60T 2201/03; B60T 2201/122; B60T 2250/04
See application file for complete search history.

(56) References Cited

U.S. PATENT DOCUMENTS

| | | | | |
|---|---|---|---|---|
| 4,858,438 A | * | 8/1989 | Douillet | B60T 13/14 60/566 |
| 6,412,881 B1 | * | 7/2002 | Isono | B60T 8/367 188/356 |

(Continued)

FOREIGN PATENT DOCUMENTS

DE 102014225539 A1 6/2016

*Primary Examiner* — Rodney A Butler
(74) *Attorney, Agent, or Firm* — Norton Rose Fulbright US LLP; Gerard Messina

(57) ABSTRACT

A control device and a method for operating a hydraulic braking system of a vehicle, a volume supplementation in a motorized plunger device being effectuatable by moving a plunger of the motorized plunger device at a maximum movement speed by a maximum movement travel in a pressure reduction direction, at least one setpoint variable regarding the maximum movement speed and/or the maximum movement travel of the plunger during the subsequent volume supplementation being established, before the volume supplementation, with consideration of at least one provided variable regarding current driving situation information and/or surroundings information, and the motor of the motorized plunger device is activated during the subsequent volume supplementation with consideration of the at least one established setpoint variable.

10 Claims, 2 Drawing Sheets

(51) Int. Cl.
*B60T 7/04* (2006.01)
*B60T 8/00* (2006.01)
*B60T 8/17* (2006.01)
*B60T 13/74* (2006.01)
*B60T 8/40* (2006.01)

(56) References Cited

U.S. PATENT DOCUMENTS

2017/0327098 A1* 11/2017 Leiber .................... B60T 7/042
2017/0361824 A1* 12/2017 Rizzo ................. B60T 8/17558

* cited by examiner

CONTROL DEVICE FOR AT LEAST ONE MOTORIZED PLUNGER DEVICE AND METHOD FOR OPERATING A HYDRAULIC BRAKING SYSTEM OF A VEHICLE

CROSS REFERENCE

The present application claims the benefit under 35 U.S.C. § 119 of German Patent Application No. DE 102017212360.5 filed on Jul. 19, 2017, which is expressly incorporated herein by reference in its entirety.

FIELD

The present invention relates to a control device for at least one motorized plunger device of a hydraulic braking system of a vehicle. The present invention also relates to a hydraulic braking system for a vehicle. Moreover, the present invention relates to a method for operating a hydraulic braking system of a vehicle.

BACKGROUND INFORMATION

German Patent Application No. DE 10 2014 225 539 A1 describes a hydraulic braking system for a vehicle, which is usable as a power braking system. With the aid of a motorized plunger device of the hydraulic braking system, a braking pressure increase in wheel brake cylinders of the hydraulic braking system corresponding to a driver's braking input is to be effectuatable by transferring brake fluid from the motorized plunger device into the wheel brake cylinders. In addition, a volume supplementation in the motorized plunger device is to be effectuatable, in that brake fluid from a storage volume of the braking system is drawn into the motorized plunger device.

SUMMARY

The present invention provides a control device for at least one motorized plunger device of a hydraulic braking system of a vehicle, a hydraulic braking system for a vehicle, and a method for operating a hydraulic braking system of a vehicle.

The present invention provides possibilities for adapting a sound level and a duration of a noise generated during the volume supplementation in the motorized plunger device to a current driving situation and/or to a current surroundings situation. With the aid of a situation-related reduction of the maximum movement speed of the plunger carried out during the volume supplementation and/or of the maximum movement travel of the plunger carried out during the volume supplementation, a generation of a noise, which is perceptible/audible by the driver (and, if applicable, at least one further vehicle occupant), during the volume supplementation may be avoided. In particular, in a driving situation and/or surroundings situation, in which a relatively slow volume supplementation and/or a comparatively low-volume volume supplementation is sufficient, the generation of a noise, which is perceptible/audible by the driver (and, if applicable, the at least one further vehicle occupant), may be suppressed. An irritation of the driver (and, if applicable, of the at least one further vehicle occupant) by noises perceived as distracting may therefore be avoided. The present invention therefore contributes to the increase in driving comfort for the driver and comfort for the at least one further vehicle occupant.

Due to the present invention, distracting noises during a trip of a vehicle, which conventionally occur during every volume supplementation in a motorized plunger device installed in the vehicle, are frequently eliminated. For this purpose, no hardware components on the vehicle/its hydraulic braking system need to be replaced, nor do any design changes need to be carried out on the vehicle/its hydraulic braking system. Instead, the present invention may be implemented with the aid of an appropriate programming of a control unit software. It is also expressly pointed out that a utilization of the present invention has no negative effects on a vehicle decelerability or a vehicle stability of the particular vehicle.

In one advantageous specific embodiment of the control device, the electronics device is configured for evaluating the at least one variable regarding the current driving situation information and/or surroundings information with respect to a current stability of the vehicle, with respect to a current deceleration of the vehicle, and/or with respect to a noise generation currently occurring on the vehicle, and for establishing the at least one setpoint variable regarding the maximum movement speed and/or the maximum movement travel with consideration for the current stability of the vehicle, the current deceleration of the vehicle, and/or the noise generation currently occurring on the vehicle. Therefore, the electronics device may establish, in a targeted manner, the at least one setpoint variable regarding the maximum movement speed and/or the maximum movement travel in situations which are not critical for the vehicle stability and the vehicle deceleration and/or in which comparatively loud noises already occur on the vehicle, in such a way that a generation of a noise, which is perceptible/audible by the driver (and, if applicable, the at least one further vehicle occupant), is avoided with the aid of a reduction of the maximum movement speed and/or the maximum movement travel effectuated in this way.

For example, the electronics device may be configured for assigning a current surroundings noise level and/or a current accident risk level to the at least one variable regarding the current driving situation information and/or surroundings information, and for establishing the at least one setpoint variable regarding the maximum movement speed and/or the maximum movement travel with consideration for the current surroundings noise level and/or the current accident risk level. In situations having a comparatively low surroundings noise level and/or a relatively low accident risk, the electronics device may establish the at least one setpoint variable regarding the maximum movement speed and/or the maximum movement travel in such a way that the subsequent volume supplementation in the motorized plunger device is carried out by moving the plunger of the motorized plunger device at a comparatively low maximum movement speed by a relatively small maximum movement travel. A generation of perceptible/audible noises during the volume supplementation is therefore preventable, in a targeted manner, when the driver would hear these noises due to the comparatively low surroundings noise level. In addition, a slow and/or low-volume volume supplementation at the relatively low accident risk level has no disadvantage. By comparison, at a comparatively high surroundings noise level and/or a relatively high accident risk level, the at least one setpoint variable regarding the maximum movement speed and/or the maximum movement travel may be established by the electronics device in such a way that the subsequent volume supplementation in the motorized plunger device is carried out by moving the plunger of the motorized plunger device at a comparatively high maximum movement speed by a relatively high maximum movement travel. In situations having a comparatively high surroundings noise level and/or a relatively high accident risk level, it is therefore ensured that the motorized plunger device has a sufficient volume of brake fluid again at an early point in time, due to the rapid and/or high-volume volume supplementation. In situations having a high surroundings noise level, the noises generated during the subsequent volume supplementation may also be barely perceived/heard by the driver (and, if applicable, the at least one further vehicle occupant).

In yet another advantageous specific embodiment of the control device, the at least one variable regarding the current driving situation information and/or surroundings information includes a current speed of the vehicle, the current deceleration of the vehicle, at least one current braking pressure in the at least one wheel brake cylinder of the hydraulic braking system, a current plunger pressure in the motorized plunger device, a friction coefficient from a friction coefficient map, a volume consumption rate of the motorized plunger device, and/or at least one vehicle control variable. Therefore, information which is generally continuously (re-)ascertained during a trip of the vehicle or which is already present may be evaluated by the control device/the electronics device. A utilization of the control device in a vehicle type therefore generally requires no retrofitting of the vehicle type with a further sensor system.

As an advantageous refinement of the control device, the electronics device may be additionally configured for controlling at least one shut-off valve of the hydraulic braking system, which is situated between the at least one wheel brake cylinder and the motorized plunger device, into an open state during the braking pressure increase in the at least one wheel brake cylinder and for controlling the at least one shut-off valve into a closed state during the volume supplementation. A proper functioning of the control device may thereby be easily increased.

The above-described advantages are also effectuated in a hydraulic braking system for a vehicle including such a control device, the motorized plunger device, and the at least one wheel brake cylinder. The hydraulic braking system is refinable according to the above-explained specific embodiments of the control device.

Moreover, a carrying-out of a corresponding method for operating a hydraulic braking system of a vehicle also yields the above-explained advantages. It is expressly pointed out that the method for operating a hydraulic braking system of a vehicle according to the above-described specific embodiments of the control device is refinable.

BRIEF DESCRIPTION OF THE DRAWINGS

Further features and advantages of the present invention are explained in the following with reference to the figures.

DETAILED DESCRIPTION OF EXAMPLE EMBODIMENTS

Figure 1:
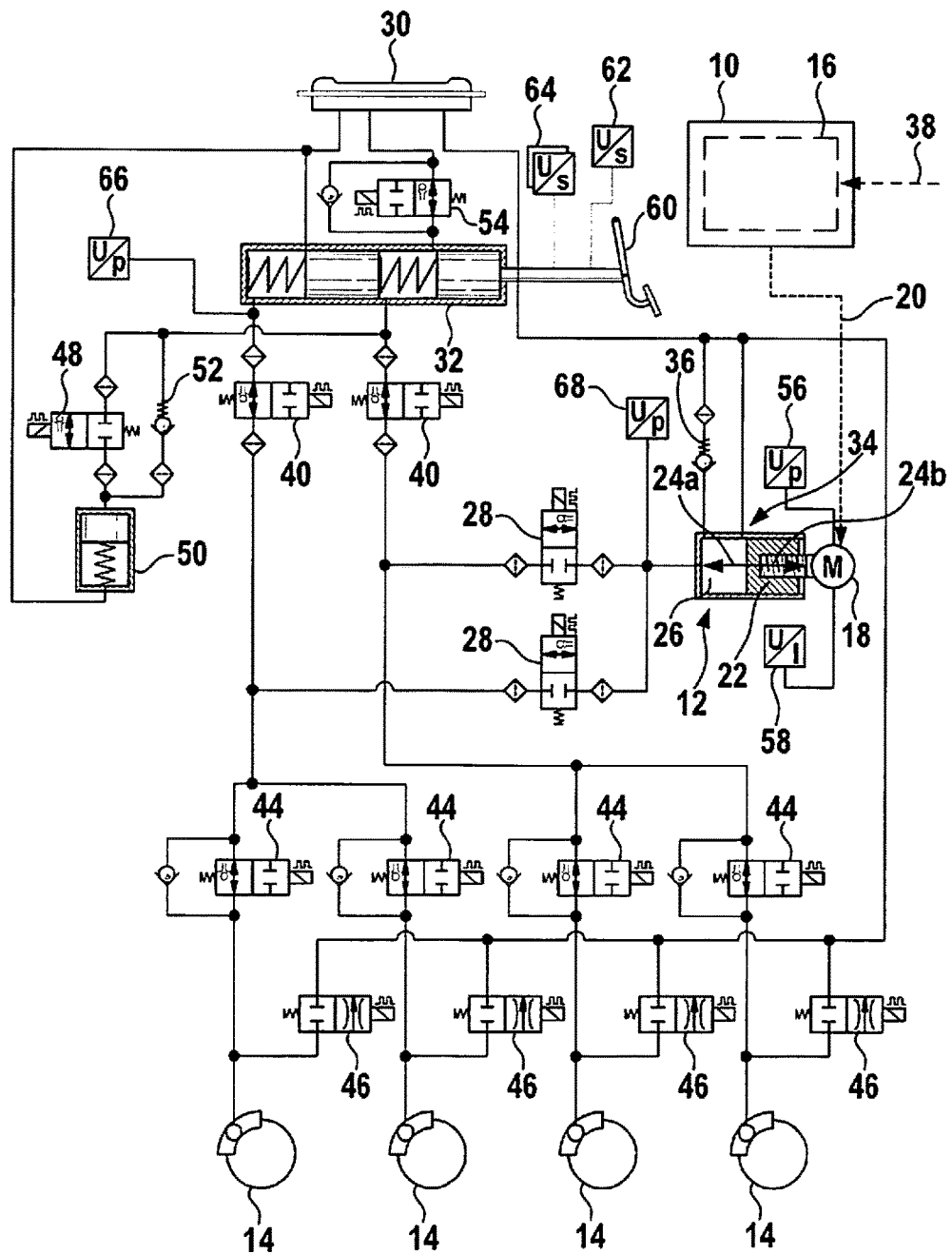
FIG. 1 shows a schematic representation of one specific embodiment of the control device and a hydraulic braking system equipped therewith.

FIG. 1 shows a schematic representation of one specific embodiment of the control device and a hydraulic braking system equipped therewith.

It is expressly pointed out that a usability of control device 10 described in the following is not limited to the hydraulic braking system schematically represented in FIG. 1. Instead, control device 10 is usable in any braking system type of hydraulic braking systems, which is designed including at least control device 10, a motorized plunger device 12, and at least one wheel brake cylinder 14. Motorized plunger device 12 may also be referred to as an "electronically controlled plunger" and/or as a motorized piston/cylinder device. In addition, a usability of control device 10 is not limited to a certain vehicle type/motor vehicle type of a vehicle/motor vehicle equipped with the hydraulic braking system.

Control device 10 is designed for operating at least motorized plunger device 12. For this purpose, control device 10 includes an electronics device 16 which is configured for activating a motor 18 of motorized plunger device 12 (with the aid of at least one motor control signal 20). With the aid of electronics device 16, a braking pressure increase, for example, in the at least one wheel brake cylinder 14 of the hydraulic braking system is effectuatable/ effectuated by moving a plunger 22 of motorized plunger device 12 with the aid of motor 18, which is activated by electronics device 16 (with the aid of the at least one motor control signal 20), in a pressure build-up direction 24a, so that brake fluid may be/is pressed out of an inner volume 26 of motorized plunger device 12. Motorized plunger device 12 is hydraulically connected to the at least one wheel brake cylinder 14 in such a way that the brake fluid pressed out of inner volume 26 of motorized plunger device 12 may be/is transferred into the at least one wheel brake cylinder 14. Merely by way of example, in the specific embodiment of FIG. 1, at least one first shut-off valve 28 is situated/ interconnected between motorized plunger device 12 and the at least one wheel brake cylinder 14 in such a way that the brake fluid pressed out of the inner volume may be/is transferred out of motorized plunger device 12 via the at least one open first shut-off valve 28 into the at least one wheel brake cylinder 14.

With the aid of electronics device 16, a volume supplementation in motorized plunger device 12 (i.e., a "refilling of motorized plunger device 12 with brake fluid without a withdrawal of brake fluid from wheel brake cylinder 14) is also effectuatable. Motorized plunger device 12 is therefore suitable for multiple and significant pressure build-ups in the at least one wheel brake cylinder 14, where inner volume 26 of motorized plunger device 12 may be easily refilled with the aid of an at least one-time volume supplementation, without this triggering a braking pressure reduction in the at least one wheel brake cylinder 14. (During a time duration of the volume supplementation, motorized plunger device 12 may not be utilized for pressure build-ups in the at least one wheel brake cylinder 14.)

The particular volume supplementation takes place by moving plunger 22 of motorized plunger device 12 with the aid of motor 18 activated by electronics device 14 (with the aid of the at least one motor control signal 20) at a maximum movement speed by a maximum movement travel in a pressure-reduction direction 24b directed opposite to pressure build-up direction 24a. Motorized plunger device 12 is hydraulically connected to a storage volume 30, such as a brake fluid reservoir 30 connected to a main brake cylinder 32, in such a way that brake fluid may be/is drawn out of storage volume 30 into motorized plunger device 12/its inner volume 26 with the aid of the movement of plunger 22 in pressure reduction direction 24b. With the aid of the movement of plunger 22 in pressure reduction direction 24b, a low pressure as compared to a storage pressure (such as the atmospheric pressure) present in storage volume 30 may be generated in inner volume 26 of motorized plunger device 12, which triggers the drawing-in of the brake fluid from storage volume 30 into motorized plunger device 12/its inner volume 26. The connection, which is depicted in FIG. 1, of motorized plunger device 12 to storage volume 30 via a snifting bore 34 and a pressure relief valve 36 (which is opened in the presence of the low pressure) situated in parallel thereto is to be interpreted merely as an example.

The maximum movement speed of plunger 22 moved for the purpose of volume supplementation is to be understood to be a movement speed which is not exceeded during the particular volume supplementation. Correspondingly, the maximum movement travel of plunger 22 moved for the purpose of volume supplementation is to be understood to be a maximum movement travel carried out during the particular volume supplementation, so that plunger 22 moved by the maximum movement travel remains unmoved or is moved again in pressure build-up direction 24a and the volume supplementation is concluded. Electronics device 16 is additionally configured for establishing, before a volume supplementation is carried out, at least one setpoint variable regarding the maximum movement speed and/or the maximum movement travel of plunger 22 during the subsequent volume supplementation in motorized plunger device 12 while taking into consideration at least one provided variable 38 regarding current driving situation information and/or surroundings information. Moreover, electronics device 16 is configured for activating motor 18 of motorized plunger device 12 during the subsequent volume supplementation (with the aid of the at least one motor control signal 20) with consideration for the at least one established setpoint variable in such a way that, during the volume supplementation, the maximum movement speed and/or the maximum movement travel of plunger 22 correspond/corresponds to the at least one established setpoint variable. During the subsequent volume supplementation, an exceedance of a maximum setpoint movement speed, which is (indirectly or directly) established with the aid of the at least one established setpoint variable, by the maximum movement speed of plunger 22 and/or an exceedance of a maximum setpoint movement travel, which is (indirectly or directly) established by the at least one established setpoint variable, by the maximum movement travel of plunger 22 are/is therefore prevented.

The at least one established setpoint variable may be, for example, the maximum movement speed and/or the maximum movement travel. The at least one established setpoint variable may also be at least one variable indirectly establishing/limiting the maximum movement speed and/or the maximum movement travel during the subsequent volume supplementation. The at least one established setpoint variable may be, for example, an amperage output to motor 18 during the volume supplementation and/or an energization duration of motor 18 for carrying out the volume supplementation. The examples mentioned here for the at least one setpoint variable are to be understood merely as examples, however.

The maximum movement speed of plunger 22 influences a maximum sound level of a noise generated during the particular volume supplementation. Correspondingly, the maximum movement travel of plunger 22 influences a time duration of the noise generated during the particular volume supplementation. The electronics device 16 therefore effectuates an adaptation of the noise generated during the particular volume supplementation to a current driving situation and/or a current surroundings situation with the aid of the establishment of the at least one setpoint variable with consideration of the at least one provided variable 38 regarding the current driving situation information and/or surroundings information. In particular, in a driving situation and/or surroundings situation, in which a relatively slow volume supplementation and/or a comparatively low-volume volume supplementation is sufficient, the generation of a noise, which is perceptible/audible by a driver (and, if applicable, at least one further vehicle occupant), may be avoided. Moreover, in a driving situation and/or surroundings situation, however, in which a comparatively rapid and/or relatively large-volume volume supplementation is desirable (for example, for safety reasons), the process of the volume supplementation may be concluded in a very short time and/or with a sufficiently high volume which has been refilled into inner volume 26. Generally, in a driving situation and/or surroundings situation which makes a comparatively rapid and/or relatively large-volume volume supplementation desirable (for example, for safety reasons), the driver (and, if applicable, the at least one further vehicle occupant) does not notice or barely notices the noise generated during the particular volume supplementation or does not or barely perceives this as being distracting.

The at least one variable 38 regarding the current driving situation information and/or surroundings information may include, for example, a current speed of the vehicle, a current deceleration of the vehicle, at least one current braking pressure in at least one wheel brake cylinder 14 of the hydraulic braking system, a current plunger pressure in motorized plunger device 12/its inner volume 26, a friction coefficient from a friction coefficient map, a volume consumption rate of motorized plunger device 12, and/or at least one vehicle control variable. The significance of the examples mentioned here for the at least one variable 38 is discussed below. The examples mentioned here for the at least one variable 38 are also to be interpreted merely as examples. Preferably, electronics device 16 is configured for evaluating the at least one variable 38 regarding the current driving situation information and/or surroundings information with respect to a current stability of the vehicle, with respect to the current deceleration of the vehicle, and/or with respect to a noise generation currently occurring on the vehicle, and for establishing the at least one setpoint variable regarding the maximum movement speed and/or the maximum movement travel with consideration for the current vehicle stability of the vehicle, the current deceleration of the vehicle, and/or the noise generation currently occurring on the vehicle. For example, electronics device 16 may be configured for assigning a current surroundings noise level and/or a current accident risk level to the at least one variable 38 regarding the current driving situation information and/or surroundings information, and for establishing the at least one setpoint variable regarding the maximum movement speed and/or the maximum movement travel with consideration for the current surroundings noise level and/or the current accident risk level. Electronics device 16 may be designed, in particular, for carrying out the method steps described below.

As an advantageous refinement, control device 10 may also be designed for controlling at least one further braking system component of the hydraulic braking system (in addition to motor 18 of motorized plunger device 12). For example, electronics device 16 may be configured for controlling the at least one first shut-off valve 28, which is situated between the at least one wheel brake cylinder 14 and motorized plunger device 12, into an open state during the braking pressure increase in the at least one wheel brake cylinder 14 and for controlling the at least one first shut-off valve 28 in a closed state during the volume supplementation. At least one second shut-off valve 40, via which the at least one wheel brake cylinder 14 is hydraulically connected to main brake cylinder 32, may be controllable/switchable with the aid of electronics device 16. At least one wheel inlet valve 44 assigned to the at least one wheel brake cylinder 14 and/or at least one wheel outlet valve 46 assigned to the at least one wheel brake cylinder 14 may also be controllable/switchable with the aid of electronics device 16. With the aid of controlling/switching the at least one wheel inlet valve 44 and/or the at least one wheel outlet valve 46, a wheel-specific pressure control, for example, in wheel brake cylinders 14 is possible. A bleeding of brake fluid from the at least one wheel brake cylinder 14 into brake fluid reservoir 30 utilized as storage volume 30 may be carried out wheel-specifically with the aid of controlling/switching the at least one wheel outlet valve 46. At least one simulator shut-off valve 48, via which a simulator 50 is connected to main brake cylinder 32, may also be controllable/switchable with the aid of electronics device 14. (In the specific embodiment from FIG. 1, simulator 50 is additionally connected to the main brake cylinder via a pressure relief valve 52 situated in parallel to simulator valve 48.) Moreover, a reservoir shut-off valve 54, via which main brake cylinder 32 is connected to brake fluid reservoir 30 utilized as storage volume 30, may also be controllable/switchable with the aid of electronics device 16.

In addition to the at least one variable 38 regarding the piece of driving situation and/or surroundings information, at least one further sensor signal may also be evaluatable with the aid of electronics device 16. For example, a rotation rate sensor 56 of motorized plunger device 12, a motor current sensor 58 of motorized plunger device 12, a rod travel sensor 62 situated on a brake actuating element/brake pedal 60, a differential travel sensor 64, a primary pressure sensor 66, and a pressure sensor 68 connected to motorized plunger device 12 may be evaluatable with the aid of electronics device 16.

Figure 2:
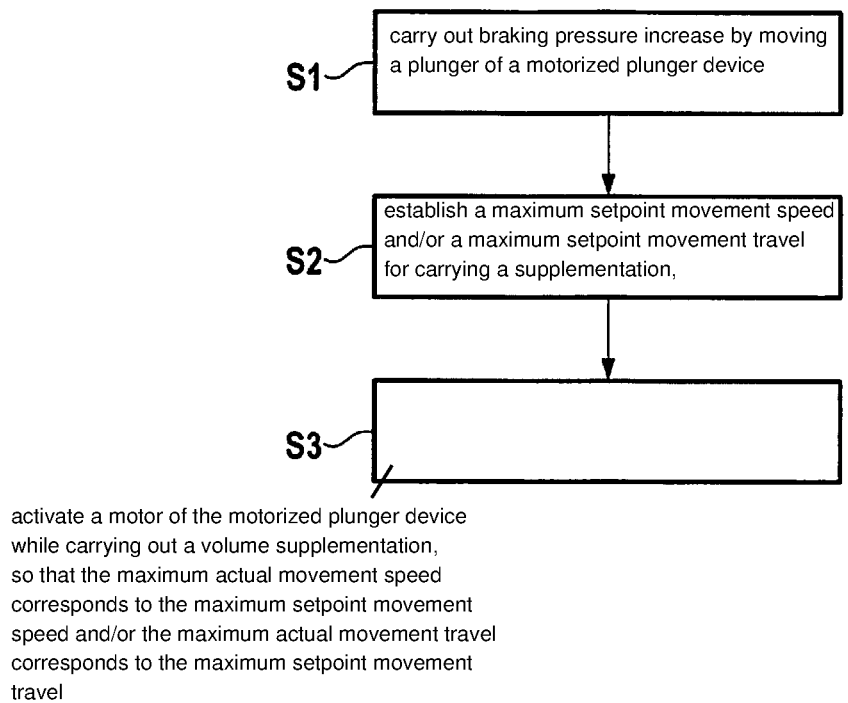
FIG. 2 shows a flow chart for explaining one specific embodiment of the method for operating a hydraulic braking system of a vehicle.

FIG. 2 shows a flow chart for explaining one specific embodiment of the method for operating a hydraulic braking system of a vehicle.

A practicability of the method described below is limited neither to a certain braking system type of the hydraulic braking system nor to a special vehicle type/motor vehicle type of the vehicle/motor vehicle. Instead, the method is implementable with any hydraulic braking system which includes at least the braking system components described below. The method is therefore implementable with the aid of the hydraulic braking system described above, without its practicability being limited to this braking system type.

In one method step S1, a braking pressure increase in at least one wheel brake cylinder of the hydraulic braking system is carried out by moving a plunger of a motorized plunger device of the hydraulic braking system in a pressure build-up direction in such a way that brake fluid is transferred from the motorized plunger device into the at least one wheel brake cylinder. In particular, if it is detected that a "brake fluid supply" in the motorized plunger device is becoming (too) low or has been used up, further method steps S2 and S3 may be carried out.

Method steps S2 and S3 effectuate a volume supplementation in the motorized plunger device by moving the plunger of the motorized plunger device at a maximum actual movement speed by a maximum actual movement travel in a pressure reduction direction, which is directed opposite to the pressure build-up direction, in such a way that brake fluid is drawn out of a storage volume of the hydraulic braking system into the motorized plunger device. For this purpose, initially, in a method step S2, a maximum setpoint movement speed for carrying out the (subsequent) volume supplementation and/or a maximum setpoint movement travel for carrying out the (subsequent) volume supplementation are/is established with consideration for at least one variable regarding current driving situation information and/or surroundings information. Subsequently, as a method step S3, a motor of the motorized plunger device is activated, while carrying out the volume supplementation, with consideration of the established maximum setpoint movement speed and/or the established maximum setpoint movement travel, in such a way that, while carrying out the volume supplementation, the maximum actual movement speed corresponds to the established maximum setpoint movement speed and/or the maximum actual movement travel corresponds to the established maximum setpoint movement travel. Therefore, carrying out method steps S2 and S3 also yields the above-described advantages.

Preferably, in method step S2, the at least one variable regarding the current driving situation information and/or surroundings information is evaluated with respect to a current stability of the vehicle, with respect to a current deceleration of the vehicle, and/or with respect to a noise generation currently occurring in the vehicle. The maximum setpoint movement speed and/or the maximum setpoint movement travel are/is then established with consideration for the current stability of the vehicle, the current deceleration of the vehicle, and/or the noise generation currently occurring on the vehicle. For example, in the case of a relatively low current stability of the vehicle, in the case of a comparatively strong current deceleration of the vehicle, and/or in the case of a loud noise generation in the vehicle, a relatively high maximum setpoint movement speed and/or a comparatively great maximum setpoint movement travel may be selected, in order to complete the volume supplementation in a very short time and/or with a sufficiently high volume refilled into the inner volume 26. By comparison, it is advantageous, in the case of a relatively high current stability of the vehicle, in the case of a comparatively low current deceleration of the vehicle, and/or in the case of a trip of the vehicle generating little noise (or in the case of a standstill of the vehicle), to select a relatively low maximum setpoint movement speed and/or a comparatively small maximum setpoint movement travel, so that the driver (and, if applicable, at least one further vehicle occupant) does not hear or barely hears a noise generated by the volume supplementation.

Alternatively or in addition, a current surroundings noise level and/or a current accident risk level may also be assigned to the at least one variable regarding the current driving situation information and/or surroundings information. In this case, the maximum setpoint movement speed and/or the setpoint movement travel may be established with consideration for the current surroundings noise level and/or the current accident risk level. In the case of a comparatively low current surroundings noise level and/or a relatively low accident risk level, a relatively low maximum setpoint movement speed and/or a comparatively small maximum setpoint movement travel are preferred, in order to minimize the sound level and/or duration of a noise generated by the volume supplementation in such a way that the driver (and, if applicable, the at least one further vehicle occupant) does not perceive/barely perceives it. By comparison, in the case of a comparatively high current surroundings noise level and/or a relatively high accident risk level, a relatively high maximum setpoint movement speed and/or a comparatively large maximum movement travel are/is advantageous for the aforementioned reasons.

In the following, it is explained why it is advantageous when the at least one variable regarding the current driving situation information and/or surroundings information includes a current speed of the vehicle, the current deceleration of the vehicle, at least one current braking pressure in the at least one wheel brake cylinder of the hydraulic braking system, a current plunger pressure in the motorized plunger device, a friction coefficient from a friction coefficient map, a volume consumption rate of the motorized plunger device, and/or at least one vehicle control variable.

A comparatively loud noise generation on the vehicle (or a relatively high surroundings noise level) is present, for example, due to loud engine noises and/or a relatively strong airflow in the case of a comparatively high current speed of the vehicle. A comparatively low current speed of the vehicle (or a standstill of the vehicle), however, is marginally associated with loud engine noises and/or a relatively strong airflow.

A comparatively loud noise generation in the vehicle (or a relatively high surroundings noise level) may also be due to braking noises during a strong current deceleration of the vehicle, in the case of at least one high current braking pressure in the at least one wheel brake cylinder of the hydraulic braking system, and/or a high current plunger pressure in the motorized plunger device (which, at the beginning of the volume supplementation, frequently corresponds to the at least one current braking pressure).

A trip of the vehicle generating comparatively little noise (or a relatively low surroundings noise level) is frequently present during travel on a roadway having a low friction coefficient. (Examples thereof are travel on an icy roadway, a snow-covered roadway, or a roadway having an artificial low coefficient of friction due to merely low tire rolling noises.) Current travel on a roadway having a low friction coefficient is apparent via a comparatively low current deceleration of the vehicle (for example, in a range between 0 m/s$^2$ and −5 m/s$^2$), at least one relatively low current braking pressure in the at least one wheel brake cylinder of the hydraulic braking system (or a relatively low current plunger pressure in the motorized plunger device), and/or an (externally delivered) friction coefficient from a friction coefficient map. Correspondingly, a current trip on a roadway having a high friction coefficient, such as a dry asphalt roadway, a rough road section or an unpaved road, may also be detected via a comparatively high current deceleration of the vehicle, the at least one relatively high current braking pressure (or the relatively high current plunger pressure), and/or the friction coefficient from the friction coefficient map.

The volume consumption rate $V_r$ (volume consumed per unit of time in cubic centimeters/second) is defined according to the equation (Equation 1), as:

$$V_r = \frac{dx}{dt} * A_t \quad \text{(Equation 1)}$$

where A is a press-in surface area of the plunger and x is a position of the plunger. Although a high volume consumption rate means a comparatively frequent volume supplementation, this mostly takes place during a trip of the vehicle generating comparatively little noise (or during a comparatively low surroundings noise level). Examples thereof are a trip in a traffic jam or a "waiting stop" at a railroad crossing. (Mention is also frequently made of an internal leakage in such situations.) With the aid of the method described here, however, it may also be ensured in these situations that the driver (and, if applicable, the at least one further vehicle occupant) perceives no distracting noises.

The at least one vehicle control variable may indicate, for example, a current carrying-out of a drive slip control (TCS, traction control system), a traction control, an anti-lock function (ABS), or an electronic stability program (VDC, vehicle dynamics control). The at least one vehicle control variable therefore provides reliable details regarding the current stability of the vehicle.

Moreover, it is also pointed out that, in method step S2, at least one sensor signal provided by a surroundings detection sensor may also be evaluated as the at least one variable.

What is claimed is:

1. A control device for at least one motorized plunger device of a hydraulic braking system of a vehicle, comprising:
    an electronics device which is configured for activating a motor of the motorized plunger device, wherein, with the aid of the electronics device:
        a braking pressure increase in at least one wheel brake cylinder of the hydraulic braking system is effectuatable by moving a plunger of the motorized plunger device, with the aid of the motor activated by the electronics device, in a pressure build-up direction, so that brake fluid is transferrable from the motorized plunger device into the at least one wheel brake cylinder; and
        a volume supplementation in the motorized plunger device is effectuatable by moving the plunger of the motorized plunger device with the aid of the motor activated by the electronics device at a maximum movement speed by a maximum movement travel in a pressure reduction direction which is directed opposite to the pressure build-up direction, so that brake fluid is drawable out of a storage volume of the hydraulic braking system into the motorized plunger device;
    wherein the electronics device is configured to, before a volume supplementation:
        establish at least one setpoint variable regarding at least one of: the maximum movement speed and the maximum movement travel, of the plunger during the volume supplementation while taking into consideration at least one provided variable regarding at least one of: (i) current driving situation information, and (ii) current surroundings information; and
        activate the motor of the motorized plunger device during the volume supplementation with consideration of the at least one established setpoint variable in such a way that, during the volume supplementation, the at least one of the maximum movement speed and the maximum movement travel corresponds to the at least one established setpoint variable.

2. The control device as recited in claim 1, wherein the electronics device is configured to evaluate the at least one variable regarding the at least one of the current driving situation information and the current surroundings information with respect to a current stability of the vehicle, at least one of: (i) with respect to a current deceleration of the vehicle, and (ii) with respect to a noise generation currently occurring on the vehicle, and to establish the at least one setpoint variable regarding the at least one of the maximum movement speed and the maximum movement travel with consideration of at least one of: (i) the current stability of the vehicle, (ii) the current deceleration of the vehicle, and (iii) the noise generation currently occurring in the vehicle.

3. The control device as recited in claim 1, wherein the electronics device is configured to assign at least one of: (i) a current surroundings noise level, and (ii) a current accident risk level, to the at least one variable regarding the at least one of the current driving situation information and the current surroundings information, and to establish the at least one setpoint variable regarding at least one of: (i) the maximum movement speed, and (ii) the maximum movement travel, with consideration of at least one of the current surroundings noise level and the current accident risk level.

4. The control device as recited in claim 1, wherein the at least one variable regarding the at least one of the current driving situation information and the current surroundings information, includes at least one of: a current speed of the vehicle, a current deceleration of the vehicle, at least one current braking pressure in the at least one wheel brake cylinder of the hydraulic braking system, a current plunger pressure in the motorized plunger device, a friction coefficient from a friction coefficient map, a volume consumption rate of the motorized plunger device, and at least one vehicle control variable.

5. The control device as recited in claim 1, wherein the electronics device is additionally configured for controlling at least one shut-off valve of the hydraulic braking system, which is situated between the at least one wheel brake cylinder and the motorized plunger device, into an open state during the braking pressure increase in the at least one wheel brake cylinder and for controlling the at least one shut-off valve into a closed state during the volume supplementation.

6. A hydraulic braking system for a vehicle, comprising:
a control device for at least one motorized plunger device of a hydraulic braking system of a vehicle, the control device including:
an electronics device which is configured for activating a motor of the motorized plunger device, wherein, with the aid of the electronics device:
a braking pressure increase in at least one wheel brake cylinder of the hydraulic braking system is effectuatable by moving a plunger of the motorized plunger device, with the aid of the motor activated by the electronics device, in a pressure build-up direction, so that brake fluid is transferrable from the motorized plunger device into the at least one wheel brake cylinder; and
a volume supplementation in the motorized plunger device is effectuatable by moving the plunger of the motorized plunger device with the aid of the motor activated by the electronics device at a maximum movement speed by a maximum movement travel in a pressure reduction direction which is directed opposite to the pressure build-up direction, so that brake fluid is drawable out of a storage volume of the hydraulic braking system into the motorized plunger device;
wherein the electronics device is configured to, before a volume supplementation:
establish at least one setpoint variable regarding at least one of: the maximum movement speed and the maximum movement travel, of the plunger during the volume supplementation while taking into consideration at least one provided variable regarding at least one of: (i) current driving situation information, and (ii) current surroundings information; and
activate the motor of the motorized plunger device during the volume supplementation with consideration for the at least one established setpoint variable in such a way that, during the volume supplementation, the at least one of the maximum movement speed and the maximum movement travel corresponds to the at least one established setpoint variable;
the motorized plunger device; and
the at least one wheel brake cylinder.

7. A method for operating a hydraulic braking system of a vehicle, comprising:
carrying out a braking pressure increase in at least one wheel brake cylinder of the hydraulic braking system by moving a plunger of a motorized plunger device of the hydraulic braking system in a pressure build-up direction in such a way that brake fluid is transferred out of the motorized plunger device into the at least one wheel brake cylinder; and
carrying out a volume supplementation in the motorized plunger device by moving the plunger of the motorized plunger device at a maximum actual movement speed by a maximum actual movement travel in a pressure reduction direction, which is directed opposite to the pressure build-up direction, in such a way that brake fluid is drawn out of a storage volume of the hydraulic braking system into the motorized plunger device;
establishing at least one of: (i) a maximum setpoint movement speed for carrying out the volume supplementation, and (ii) a maximum setpoint movement travel for carrying out the volume supplementation, the establishing being with consideration of at least one variable regarding at least one of a current driving situation information and a current surroundings information; and
activating a motor of the motorized plunger device, while carrying out the volume supplementation, with consideration of the established at least one of the maximum setpoint movement speed and maximum setpoint movement travel, in such a way that, during carrying out the volume supplementation, at least one of: (i) a maximum actual movement speed corresponds to the established maximum setpoint movement speed, and (ii) the maximum actual movement travel corresponds to the established maximum setpoint movement travel.

8. The method as recited in claim 7, wherein the at least one variable regarding the at least one of the current driving situation information and the current surroundings information is evaluated at least one of: (i) with respect to a current stability of the vehicle, (ii) with respect to a current deceleration of the vehicle, and (iii) with respect to a noise generation currently occurring on the vehicle, and the at least one of the maximum setpoint movement speed and the maximum setpoint movement travel is established with consideration of at least one of: (i) the current stability of the vehicle, (ii) the current deceleration of the vehicle, and (iii) the noise generation currently occurring in the vehicle.

9. The method as recited in claim 7, wherein at least one of: (i) a current surroundings noise level, and (ii) a current accident risk level, is assigned to the at least one variable regarding the at least one of the current driving situation information and the current surroundings information, and at least one of the maximum setpoint movement speed and the maximum setpoint movement travel is established with consideration of at least one of: (i) the current surroundings noise level, and (ii) the current accident risk level.

10. The method as recited in claim 7, wherein the at least one variable regarding the at least one of the current driving situation information and the current surroundings information includes at least one of: (i) a current speed of the vehicle, (ii) a current deceleration of the vehicle, (iii) at least one current braking pressure in the at least one wheel brake cylinder of the hydraulic braking system, (iv) a current plunger pressure in the motorized plunger device, (v) a friction coefficient from a friction coefficient map, (vi) a volume consumption rate of the motorized plunger device, and (vii) at least one vehicle control variable.

* * * * *